(12) United States Patent
Kimelman et al.

(10) Patent No.: US 7,873,757 B2
(45) Date of Patent: Jan. 18, 2011

(54) CONTROLLING COMPLEX NON-LINEAR DATA TRANSFERS

(75) Inventors: Paul Kimelman, Alamo, CA (US); Edmond John Simon Ashfield, Cambridge (GB); Steven Richard Mellor, Sheffield (GB); Ian Field, Olympia, WA (US)

(73) Assignee: ARM Limited, Cambridge (GB)

( * ) Notice: Subject to any disclaimer, the term of this patent is extended or adjusted under 35 U.S.C. 154(b) by 661 days.

(21) Appl. No.: 11/707,275

(22) Filed: Feb. 16, 2007

(65) Prior Publication Data

US 2008/0201494 A1 Aug. 21, 2008

(51) Int. Cl.
*G06F 13/28* (2006.01)
*G06F 5/00* (2006.01)

(52) U.S. Cl. .............. 710/22; 710/28; 710/48; 711/145; 711/149; 711/169; 345/554

(58) Field of Classification Search .......... None
See application file for complete search history.

(56) References Cited

U.S. PATENT DOCUMENTS 5,121,390 A * 6/1992 Farrell et al. ........... 370/458
5,390,299 A * 2/1995 Rege et al. .............. 709/234
5,613,162 A * 3/1997 Kabenjian ............... 710/22
6,898,646 B1 5/2005 Bonola et al.
2002/0052993 A1* 5/2002 Dowling .................. 710/260
2006/0218313 A1 9/2006 Haneda et al.

FOREIGN PATENT DOCUMENTS

GB 2 433 611 6/2007
JP 8-202648 8/1996

* cited by examiner

*Primary Examiner*—Eron J Sorrell
*Assistant Examiner*—Dean Phan
(74) *Attorney, Agent, or Firm*—Nixon & Vanderhye P.C.

(57) ABSTRACT

A direct memory access controller for controlling data transfer between a plurality of data sources and a plurality of data destinations is disclosed. The plurality of data sources and data destinations communicate with the direct memory access controller via a plurality of channels, the direct memory access controller further communicates with a memory and a processor. The memory stores two sets of control data for each of the plurality of channels and for the processor. The direct memory access controller is responsive to a data transfer request received from one of said plurality of channels or from said processor to access one set of said corresponding control data stored in said memory, said direct memory access performing at least a portion of said data transfer requested in dependence upon said accessed control data.

4 Claims, 10 Drawing Sheets

Initialization:
Configure primary to enable the copy A, B, C and D operations: cycle_ctrl = b100, $2^R$ = 4, N = 16

|  | src_data_end_ptr | dst_data_end_ptr | channel_cfg | Unused |
|---|---|---|---|---|
| Data in memory for Task A | 0x0A000000 | 0x0AE00000 | cycle_ctrl = b101, $2^R$ = 4, N = 3 | 0xXXXXXXXX |
| Data in memory for Task B | 0x0B000000 | 0x0BE00000 | cycle_ctrl = b101, $2^R$ = 2, N = 8 | 0xXXXXXXXX |
| Data in memory for Task C | 0x0C000000 | 0x0CE00000 | cycle_ctrl = b101, $2^R$ = 8, N = 5 | 0xXXXXXXXX |
| Data in memory for Task D | 0x0D000000 | 0x0DE00000 | cycle_ctrl = b001, $2^R$ = 4, N = 4 | 0xXXXXXXXX |

Memory scatter-gather transaction:

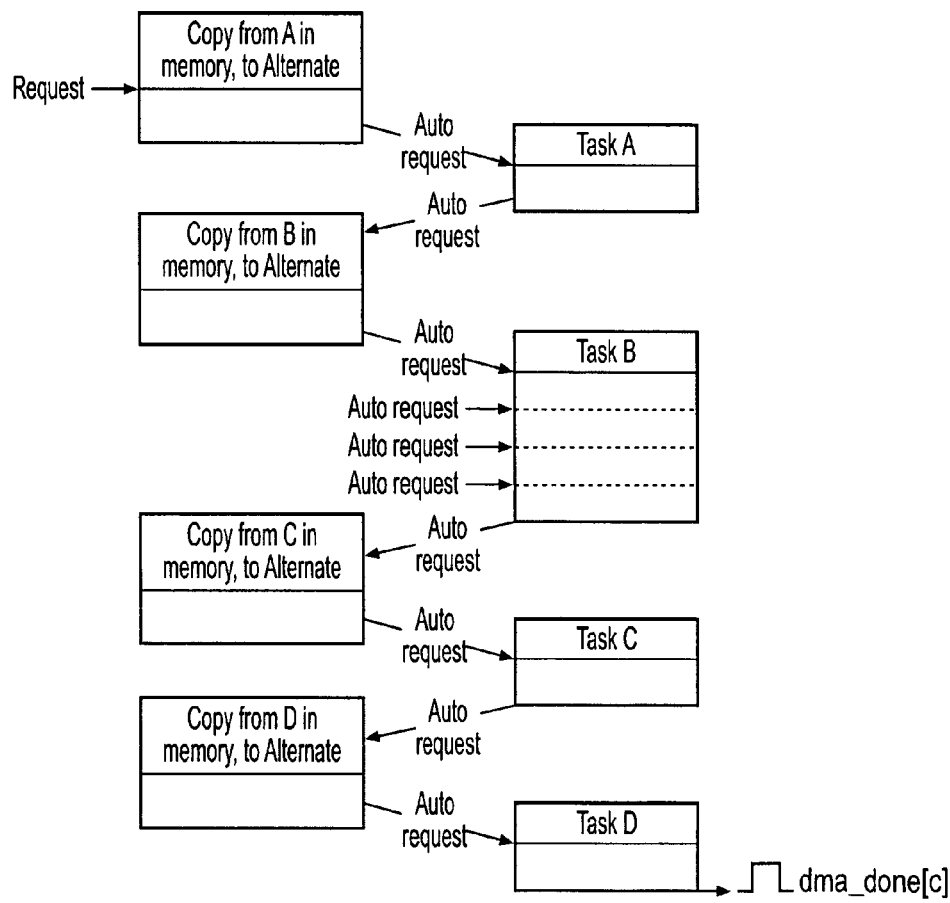

Fig. 6

Initialization:
Configure primary to enable the copy A, B, C and D operations: cycle_ctrl = b110, $2^R$ = 4, N = 16

|  | src_data_end_ptr | dst_data_end_ptr | channel_cfg | Unused |
|---|---|---|---|---|
| Data in memory for Task A | 0x0A000000 | 0x0AE00000 | cycle_ctrl = b111, $2^R$ = 4, N = 3 | 0xXXXXXXXX |
| Data in memory for Task B | 0x0B000000 | 0x0BE00000 | cycle_ctrl = b111, $2^R$ = 2, N = 8 | 0xXXXXXXXX |
| Data in memory for Task C | 0x0C000000 | 0x0CE00000 | cycle_ctrl = b111, $2^R$ = 8, N = 5 | 0xXXXXXXXX |
| Data in memory for Task D | 0x0D000000 | 0x0DE00000 | cycle_ctrl = b001, $2^R$ = 4, N = 4 | 0xXXXXXXXX |

Peripheral scatter-gather transaction:

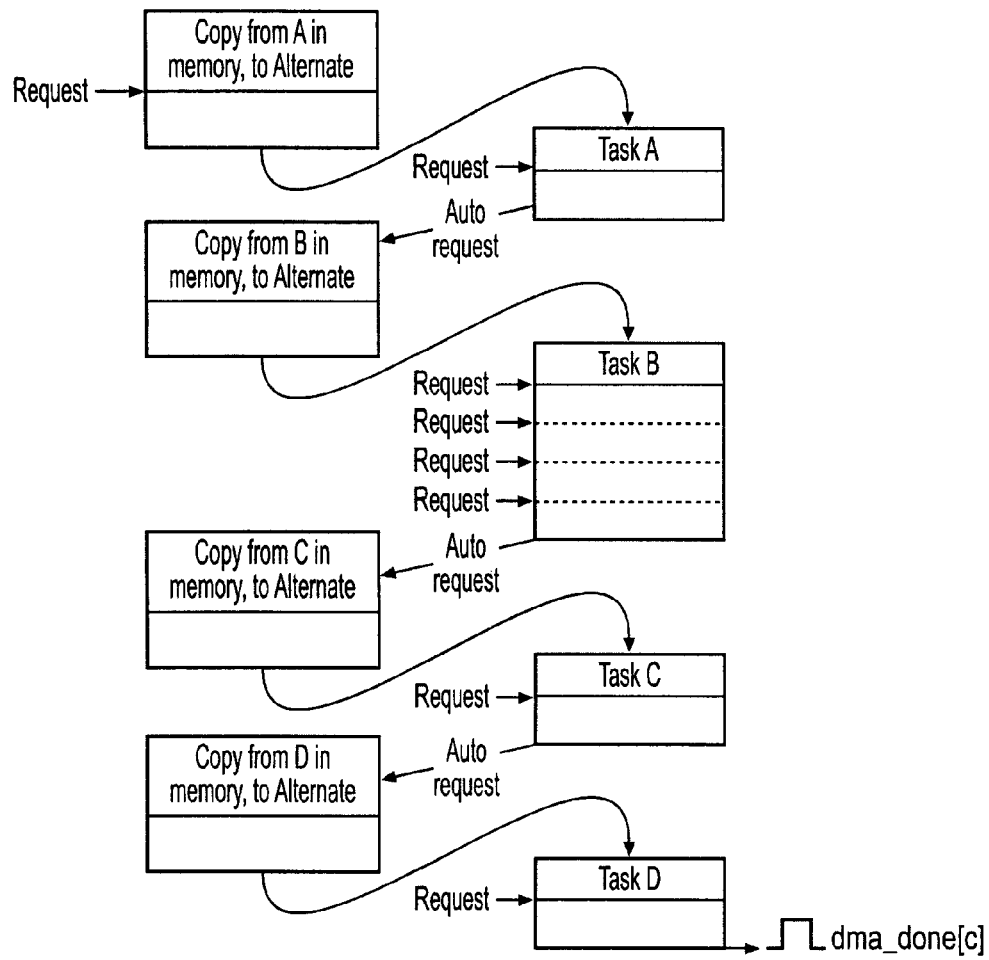

Fig. 7

| | | | | |
|---|---|---|---|---|
| Alternate_Ch_31 | 0X3F0 | Primary_Ch_31 | 0X1F0 | |
| Alternate_Ch_30 | 0X3E0 | Primary_Ch_30 | 0X1E0 | |
| Alternate_Ch_29 | 0X3D0 | Primary_Ch_29 | 0X1D0 | |
| Alternate_Ch_28 | 0X3C0 | Primary_Ch_28 | 0X1C0 | |
| Alternate_Ch_27 | 0X3B0 | Primary_Ch_27 | 0X1B0 | |
| Alternate_Ch_26 | 0X3A0 | Primary_Ch_26 | 0X1A0 | |
| Alternate_Ch_25 | 0X390 | Primary_Ch_25 | 0X190 | |
| Alternate_Ch_24 | 0X380 | Primary_Ch_24 | 0X180 | |
| Alternate_Ch_23 | 0X370 | Primary_Ch_23 | 0X170 | |
| Alternate_Ch_22 | 0X360 | Primary_Ch_22 | 0X160 | |
| Alternate_Ch_21 | 0X350 | Primary_Ch_21 | 0X150 | |
| Alternate_Ch_20 | 0X340 | Primary_Ch_20 | 0X140 | |
| Alternate_Ch_19 | 0X330 | Primary_Ch_19 | 0X130 | |
| Alternate_Ch_18 | 0X320 | Primary_Ch_18 | 0X120 | |
| Alternate_Ch_17 | 0X310 | Primary_Ch_17 | 0X110 | |
| Alternate_Ch_16 | 0X300 | Primary_Ch_16 | 0X100 | |
| Alternate_Ch_15 | 0X2F0 | Primary_Ch_15 | 0X0F0 | |
| Alternate_Ch_14 | 0X2E0 | Primary_Ch_14 | 0X0E0 | |
| Alternate_Ch_13 | 0X2D0 | Primary_Ch_13 | 0X0D0 | |
| Alternate_Ch_12 | 0X2C0 | Primary_Ch_12 | 0X0C0 | |
| Alternate_Ch_11 | 0X2B0 | Primary_Ch_11 | 0X0B0 | |
| Alternate_Ch_10 | 0X2A0 | Primary_Ch_10 | 0X0A0 | |
| Alternate_Ch_9 | 0X290 | Primary_Ch_9 | 0X090 | |
| Alternate_Ch_8 | 0X280 | Primary_Ch_8 | 0X080 | |
| Alternate_Ch_7 | 0X270 | Primary_Ch_7 | 0X070 | |
| Alternate_Ch_6 | 0X260 | Primary_Ch_6 | 0X060 | |
| Alternate_Ch_5 | 0X250 | Primary_Ch_5 | 0X050 | |
| Alternate_Ch_4 | 0X240 | Primary_Ch_4 | 0X040 | |
| Alternate_Ch_3 | 0X230 | Primary_Ch_3 | 0X030 | Unused 0x00C |
| Alternate_Ch_2 | 0X220 | Primary_Ch_2 | 0X020 | Control 0x008 |
| Alternate_Ch_1 | 0X210 | Primary_Ch_1 | 0X010 | Destination End Pointer 0x004 |
| Alternate_Ch_0 | 0X200 | Primary_Ch_0 | 0X000 | Source End Pointer 0x000 |

Fig. 8

| | | |
|---|---|---|
| | Unused | 0X07C |
| | Unused | 0X078 |
| | Unused | 0X074 |
| | Unused | 0X070 |
| Alternate channel 2 | Unused | 0X06C |
| | Control | 0X068 |
| | Destination End Pointer | 0X064 |
| | Source End Pointer | 0X060 |
| Alternate channel 1 | Unused | 0X05C |
| | Control | 0X058 |
| | Destination End Pointer | 0X054 |
| | Source End Pointer | 0X050 |
| Alternate channel 0 | Unused | 0X04C |
| | Control | 0X048 |
| | Destination End Pointer | 0X044 |
| | Source End Pointer | 0X040 |
| | Unused | 0X03C |
| | Unused | 0X038 |
| | Unused | 0X034 |
| | Unused | 0X030 |
| Primary channel 2 | Unused | 0X02C |
| | Control | 0X028 |
| | Destination End Pointer | 0X024 |
| | Source End Pointer | 0X020 |
| Primary channel 1 | Unused | 0X01C |
| | Control | 0X018 |
| | Destination End Pointer | 0X014 |
| | Source End Pointer | 0X010 |
| Primary channel 0 | Unused | 0X00C |
| | Control | 0X008 |
| | Destination End Pointer | 0X004 |
| | Source End Pointer | 0X000 |

Fig. 9

CONTROLLING COMPLEX NON-LINEAR DATA TRANSFERS

BACKGROUND OF THE INVENTION

1. Field of the Invention

The field of the invention relates to data processing and in particular to the control of data transfers using a direct memory access controller.

2. Description of the Prior Art

It is known to provide direct memory access controllers, or DMAC for controlling data access between different functional units such as memory and peripherals, without the need to use and therefore interrupt the processor.

A DMA controller may control data transfers between a number of peripherals and a memory. In order to control a particular data transfer a direct memory access controller requires the initial source address of the data, the destination address, the transfer width, e.g. one word i.e. 32 bits and the transfer size, e.g. 3072 bytes. These can be stored in the DMA controller itself. However, if the DMA controller is controlling the memory access of a lot of peripherals then this information needs to be stored for each of these peripherals or channels. This requires a lot of storage and increases the gate count of the DMA controller. A known way of addressing this is to store the control information for each channel in memory and to simply store a pointer to it in the DMA controller. This could be a pointer for each channel, or it could be a pointer to a base address, the control information for the various channels being stored at a known offset from this address. This is fine if the data transfers are continuous linear transfers for each channel, however, if they are disparate such as scatter/gather transfers where data is sent to several destinations or retrieved from several sources then the control data needs to be updated between transfers and this needs to be done by the processor.

One known way of addressing this problem is by the use of linked lists (see for example the PL08x DMAC made by ARM and detailed in the publication to be found at http://www.arm.com/pdfs/DDI0196G dmac pl080 r1p3 trm.pdf). In such a set up there is a register in the DMAC for each channel that points to a linked list for that channel. Each linked list controls the transfer of one block of data and then optionally loads another linked list to continue the DMA operation or stops the DMA stream. Thus, the first linked list address defines the first block of data to be transferred, the final address of this block of data storing the next linked list which defines the next block to be transferred and so on, until the next linked list address stores 00, which means that the data transfer can stop. This is an effective way of performing disparate data transfers but does require a register for each channel in the DMA controller to store the linked list pointers.

It would be desirable to have the flexibility to perform disparate data transfers without the need to interrupt the processor and yet maintain a small gate count for the DMA controller.

SUMMARY OF THE INVENTION

A first aspect of the present invention provides a direct memory access controller for controlling data transfer between a plurality of data sources and a plurality of data destinations, said plurality of data sources and data destinations communicating with said direct memory access controller via a plurality of channels, said direct memory access controller further communicating with a memory and a processor, said memory being adapted to store two sets of control data for each of said plurality of channels and for said processor; said direct memory access controller being responsive to a data transfer request received from one of said plurality of channels or from said processor to access one set of said corresponding control data stored in said memory, said direct memory access performing at least a portion of said data transfer requested in dependence upon said accessed control data.

The provision of control data for controlling memory accesses performed by a DMA controller stored within a memory associated with the DMA controller reduces the amount of data that needs to be stored within that DMA controller and therefore reduces its gate count. This is advantageous, as there are many times when the DMA controller is on and yet not active and thus, having a small gate count will improve power consumption. Thus, although when a data transfer request is received the corresponding control data needs to be accessed and this will cost more power than had this data been stored in the DMA controller itself, this is generally a small price to pay as it does not occur very often when compared to the power saved from a smaller DMA controller. Furthermore, the provision of two sets of control data for each channel and for the processor means that for each data transfer request there is in effect two possible data transfers that can be implemented. This enables complex non-linear data transfers sequences to be performed without the need for processor intervention.

In some embodiments, said direct access controller is adapted following completion of a portion of said data transfer controlled by said one set of control data to access the other of said two sets of control data for control of transfer of a further portion of said data transfer.

The two sets of control data can be used during a single data transfer request, the memory access controller automatically switching between them following completion of portions controlled by one of these sets of control data.

In other embodiments, said direct memory access controller is adapted to perform all of said data transfer in dependence upon said one set of control data and to access the other of said two sets of control data in response to a subsequent data transfer request from a same channel or processor.

It may be that a whole data transfer is performed under control of one of the sets of control data. Then when a further data transfer request is received the other set of control data will be used. It should be noted in this regard that a data transfer is considered to consist of data transferred in response to a data transfer request. Thus, in the earlier embodiment a data transfer may be performed in several portions each controlled by different control data while in this embodiment it is data transferred by one set of control data. In both cases it is data transferred in response to a particular request.

In some embodiments, said direct memory access controller comprises a register, said register being adapted to store a base address relating to storage of said control data, such that each set of control data can be accessed in dependence upon said base address.

The storage of the control data in memory reduces the amount of data that is required by the direct memory access controller. In particular, if a base address of the control data is stored in a single register then this is all that is required for the DMA controller to calculate where each of the different sets of control data will be stored provided they are stored in a known arrangement.

In some embodiments, said direct memory access controller comprises an indicator store for each of said plurality of channels and processor, said indicator store comprising an indicator bit indicating which of said two sets of control data is to be accessed, said direct memory access controller being adapted to toggle said indicator bit following completion of at least a portion of said data transfer controlled by said one set of control data.

A convenient way of the DMA controller knowing which of the control data to use is by the use of an indicator store which stores a bit. This is toggled following completion of a data transfer controlled by one of the sets of control data so that the other set of control data is automatically used for the next data access. The next data access may be a portion of the data transfer or it may be a new data transfer.

In some embodiments said control data comprises a source pointer indicating a source of said data, a destination pointer indicating a destination for said data, and type data indicating a type of said data transfer.

The control data may contain a number of things, and in some embodiments includes information indicating the type of data transfer. It is this information that determines how the controller reacts to a data transfer request and whether in particular, how it uses the two sets of control data.

In some embodiments, said direct memory access controller is responsive to completion of a data transfer controlled by said one set of control data to issue an interrupt to said processor to request that said one set of control data is updated, and is responsive to said subsequent data transfer request to access said other set of control data and to perform a further data transfer controlled by said other set of control data, and following completion of said further data transfer to issue an interrupt to said processor to request that said other set of control data is updated, and in response to a further data transfer request from a same channel or processor to access said one set of control data if it has been updated and to commence said further data transfer under control of said one set of control data, and if said one set of control data is detected as not being updated to halt said further data transfer.

One particular type of disparate data transfers that embodiments of the present invention are particularly adapted to deal with are ping pong data transfers. In this case, following a data transfer controlled by one set of control data the DMA controller issues an interrupt to the processor to ask for this control data to be updated. It can then perform a further data transfer request using that channel using the other set of control data. If the processor manages to update the first set of control data during this transfer, then following a further transfer request the new updated control data can be used. In this way, the DMA controller can control many different data transfers in a row.

In some embodiments said direct memory access controller is responsive to completion of a data transfer controlled by said one set of control data to mark said one set of control data as invalid, and to issue an interrupt to said processor to request that said one set of control data marked as invalid is updated and then marked valid, and following completion of said further data transfer to mark said other set of control data as invalid and to issue an interrupt to said processor to request that said other set of control data is updated and marked as valid, and detect if said one set of control data is updated in dependence upon whether it is marked as valid or invalid.

Although there are different ways of determining whether of not the control data has been updated before it is used again, one simple yet effective way is to mark the control data as invalid following use and valid once it has been updated. It is then straightforward for the DMA controller to know whether the control data is ready or not. If it is not ready then it halts the data transfer.

In some embodiments said portion of said data transfer controlled by said one set of control data comprises overwriting said other set of control data, said further portion of said data transfer being controlled by said updated other set of control data, such that said direct memory access controller is adapted to perform a sequence of data transfers using updated control data without requiring processor intervention.

Embodiments of the present invention are also particular applicable to memory scatter gather data transfers. This involves a memory access controller using one set of control data to update the other set of control data. In this way, a number of data transfers can be made to a number of different addresses without the need for processor intervention. Thus, a disparate data transfers are made without needing to interrupt the processor.

In some embodiments, one of said further portion of said data transfer being controlled by said updated other set of control data comprises overwriting said one set of control data.

If one of the sets of control data updates the other one then the number of times this can occur is bounded by the size of the data transfer of the first data transfer. If however, the other set of control data can also overwrite the one set of control data after a certain number of data transfers then this is only bounded by the size of the memory allocated for storing the channel control data.

In some embodiments, said direct memory access controller is adapted to continually perform subsequent data transfers controlled by said one set of control data and said other set of control data until said processor disables said channel or said data transfer completes.

This data transfer may be stopped either by it completing or by the processor disabling the channel.

In some embodiments, said direct memory access controller is responsive to a further data request to access said one set of control data and perform a portion of a further data transfer under control of said one set of control data, said portion of said further data transfer comprising overwriting said other set of control data, said direct memory access controller being responsive to completion of said portion of said further data transfer controlled by said one set of control data to access said updated other set of control data and to perform a further portion of said further data transfer under control of said updated control data.

In the case of scatter gather data transfers from a data request issued by the memory or in effect by a software interrupt from the processor then the data transfer request continues automatically without further requests being received. If however, it is a peripheral that has requested this memory scatter gather then each time the second set of data has been used the DMA controller waits for a new data transfer request to proceed.

A further aspect of the present invention provides a data processing apparatus comprising a plurality of data source/destinations, a memory, a processor and a direct memory access controller according to a first aspect of the invention for controlling data transfers between said data source/destinations and said memory, said data source/destinations communicating with said direct memory access controller via said plurality of channels and said memory being adapted to store said two sets of control data corresponding to each of said plurality of channels and processor.

Although said plurality of data source/destinations could be a number of things in some embodiments they comprise peripherals. Direct memory access controllers are particularly useful for controlling data transfers between peripherals and memory.

A yet further aspect of the invention provides a direct memory access control method for controlling data transfer between a plurality of data sources and a plurality of data destinations, said plurality of data sources and data destinations communicating with said direct memory access controller via a plurality of channels, said direct memory access controller further communicating with a memory and a processor, said memory being adapted to store two sets of control data for each of said plurality of channels and said processor; said direct memory access control method comprising the steps of receiving a data transfer request from one of said plurality of channels or said processor; in response to said data transfer request accessing one set of said control data stored in said memory relating to said corresponding channel or processor; and performing at least a portion of said data transfer under control of said accessed control data.

The above, and other objects, features and advantages of this invention will be apparent from the following detailed description of illustrative embodiments which is to be read in connection with the accompanying drawings.

BRIEF DESCRIPTION OF THE DRAWINGS

FIG. 1b illustrates the control data stored in the memory of FIG. 1a;

FIG. 6 shows a memory scatter gather embodiment;

FIG. 7 shows a peripheral scatter gather embodiment;

FIG. 8 shows a memory map for 32 channels;

FIG. 9 shows a memory map for three DMA channels; and

DESCRIPTION OF THE PREFERRED EMBODIMENTS

Figure 1A:
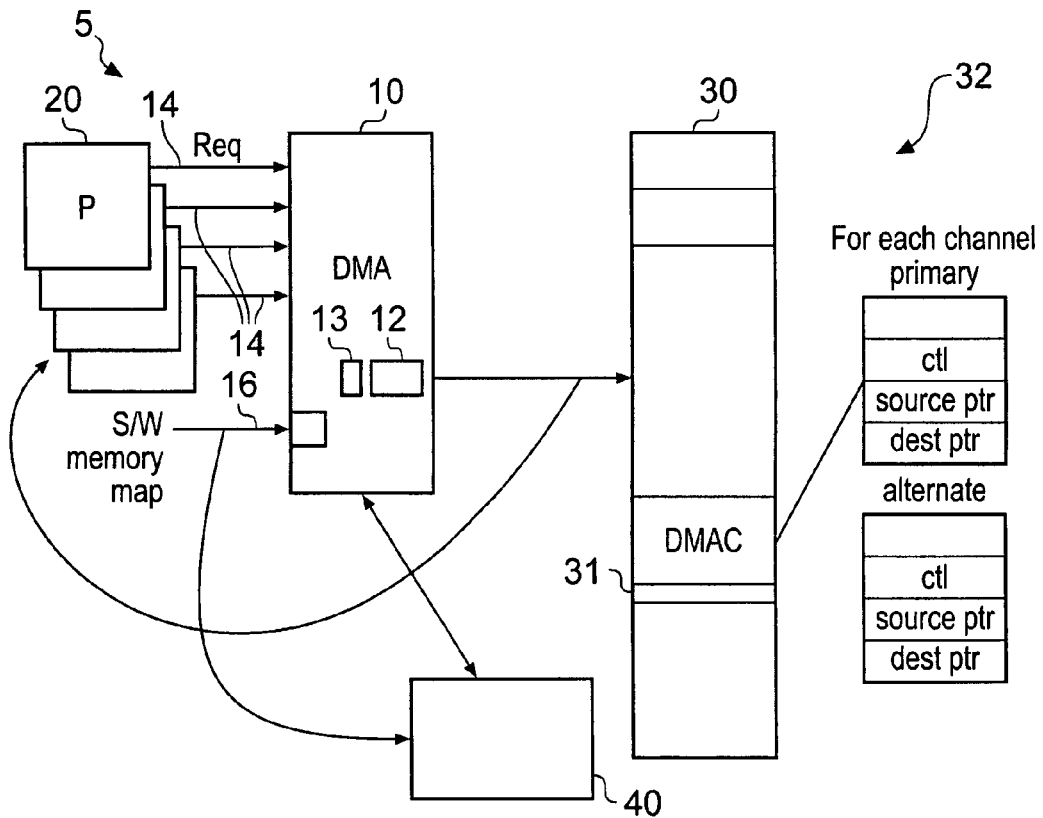
FIG. 1a illustrates a data processing apparatus according to an embodiment of the present invention.

FIG. 1a shows a data processing apparatus 5, containing a direct memory access controller according to an embodiment of the present invention. Direct memory access (DMA) controller 10 is connected to a plurality of peripherals 20, to memory 30 and to processor 40.

Memory 30 stores data that is to be transferred under control of the DMA 10 along with control data for controlling the DMA controller 10. Within DMA controller 10 there is a register 12 which contains the base address of a location 31 within memory 30 that holds the control information for a first channel of the DMA controller 10. DMA controller 10 has a plurality of channels 14 connecting the peripherals 20 to the DMA controller 10. These channels transmit data access requests from the peripherals to the DMA controller 10. It also has channel 16, which is a channel from the processor 40 and this transmits data access requests that relate to data transfers from the memory to the DMA controller 10. These are generally software generated requests. All of these channels 14, 16 receive data access requests and these data access requests are controlled by control data that is stored in memory 30. Register 12 indicates the base address 31 of the storage of this data and the DMA controller 10 can then access the appropriate set of control data from identification of this base address and from knowledge of the channel that the data access requests corresponds to.

For each channel there are two sets of control data 32 that are stored in memory 30, one of them is the primary control data and one of them is the alternate control data. In this embodiment, these are stored in four memory locations each, one of the memory locations is unused, another stores a source pointer indicating the address of the source of the data, another a destination pointer indicating where the data goes to and a further one stores control information. This control information indicates the data transfer size and address increments that the data transfer uses. It also indicates the type of data transfer, the type of data transfer determining how the primary and alternate control data are used. The storage of this data is shown in more detail in FIG. 1b.

DMA controller 10 also comprises a toggle bit 13 for each channel. This toggle bit determines which of the primary or the alternate control data is to be accessed for a particular channel for that request.

As mentioned above the control data can indicate the type of data transfer that is to be performed. It should be noted that for all data transfer types the controller arbitrates after $2^R$ DMA transfers. This prevents low priority DMA transfers from 30 blocking the DMA for too long. The value of R can be selected according to performance requirements. The value is part of the control data shown in 32 of FIG. 1b.

Figure 1B:
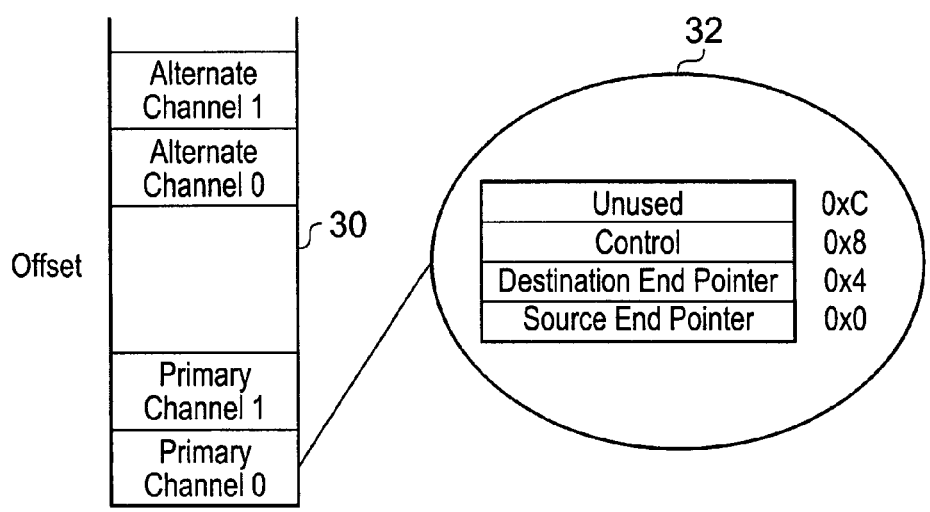

FIG. 1b shows in more detail the storage of alternate and primary control data in memory 30. In this embodiment the primary control data and alternate control data are stored together with an offset from each other such that their location can be known by the DMA controller from a base address. One set of control data for a channel is illustrated at 32, and shows four memory locations one unused, one containing control data, one the destination end pointer and one the source end pointer.

Figure 2:
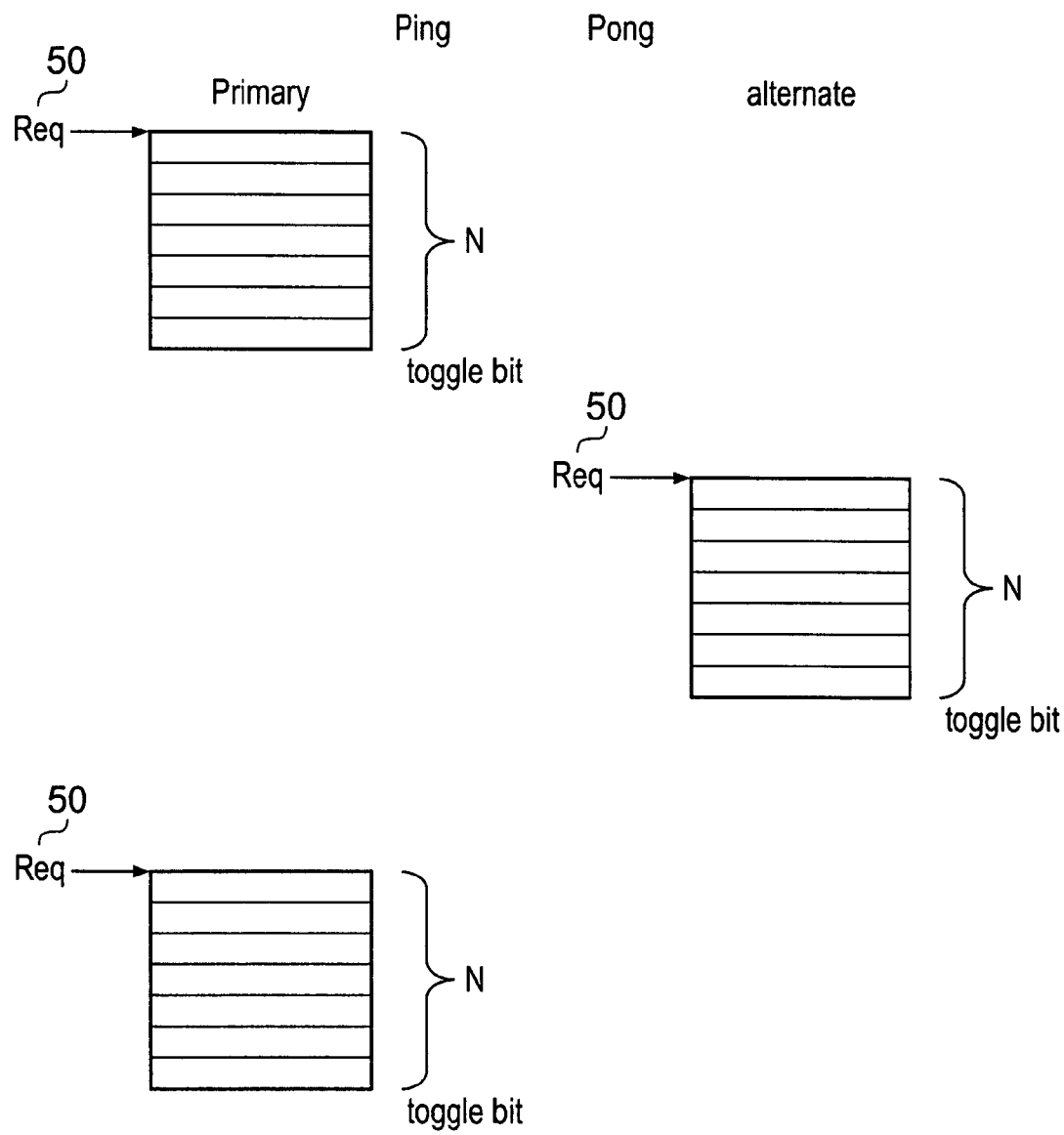
FIG. 2 shows a ping pong mode of data transfer controlled by direct memory access controller according to an embodiment of the present invention.

FIG. 2 shows one type of data transfer, the "Ping Pong" mode. In this mode the controller performs a DMA cycle using one of the control data structures in response to a data transfer request 50. At the end of this data transfer the bit indicating which control data to use is toggled. Thus, in response to another data transfer request 50 a DMA cycle is performed using the other control data structure for that channel. The control data bit is toggled as the controller continues to switch between these control data structures, i.e. from primary to alternate to primary until it reads a control data structure that is invalid or until the host processor disables the channel.

In response to a data request 50 a data transfer of N data bits commences under control of primary control data. At the end of this transfer the toggle bit for this channel (13 of FIG. 1) indicating which control data is to be used is toggled. Following a subsequent request then data is transferred using the alternate control data structure and when this is completed the toggle bit for the channel 13 is toggled again and so on. Thus, the control data toggles between primary and alternate for each new data transfer request.

Figure 3:
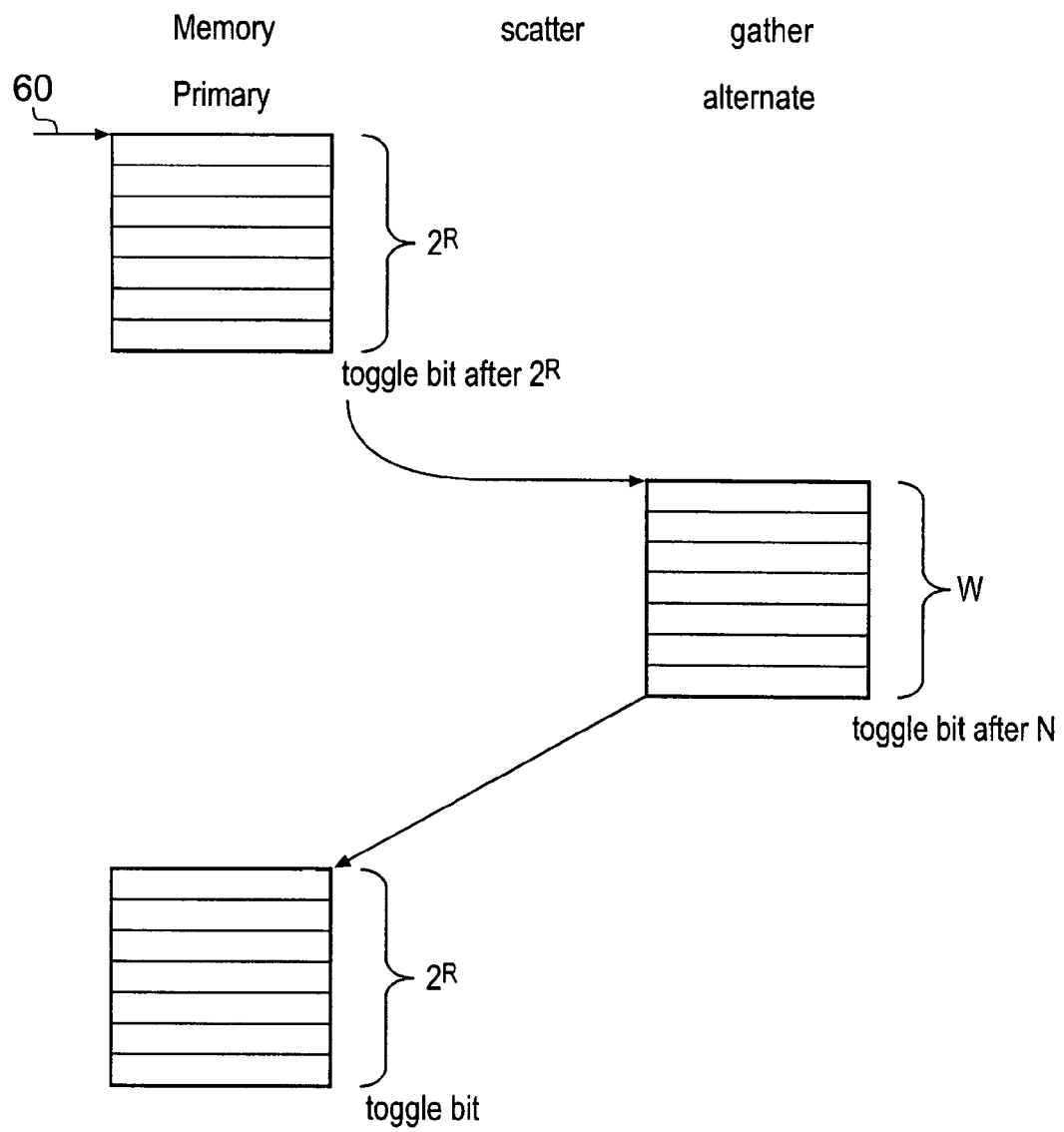
FIG. 3 shows a memory scatter gather mode of data transfer controlled by direct memory access controller according to an embodiment of the present invention.

FIG. 3 shows a further type of data transfer referred to as "memory scatter gather". In memory scatter gather mode data is transferred to a number of different locations. This is achieved by using one of the control data to control the updating of the other set of control data. This updated control data is used to control a data transfer and thus, the data transfer can be performed to a number of different locations.

In memory scatter gather according to an embodiment of the present invention, the controller receives an initial request and in response performs a DMA transfer using the primary control data structure for that channel. The primary control data controls the transfer of data to the alternate control data storage location, i.e. it updates the alternate control data. When this has completed, i.e. after 4 transfers the toggle bit is toggled, and the DMA controller then automatically switches to use the alternate control data structure whereupon a data transfer of N data items is performed. It should be noted that in this embodiment four memory locations are used to store the control data as three are needed but data transfers can only be implemented as powers of 2, thus four are locations are used. Following this the toggle bit for this channel is once again toggled and a data transfer under control of the primary control data commences again, whereupon the alternate control data is updated once more. As the DMA controller uses the primary control data to update the alternate channel control data structure, a number of data transfers can be performed in response to a single data transfer request without processor intervention. The only limit on the number of different locations data items can be transferred to under control of a single request is the number of primary data transfers that can be performed to update the alternate data transfers. This is governed by the total length of the primary data transfer. However, this limit can be overcome if the final data transfer controlled by the alternate data structure is used to update the primary control data. This will allow a whole new set of data transfers to commence. In this way, a number of data transfers that is only bounded by the size of the memory allocated for storing the channel control data can be performed.

FIG. 3 shows the above described process. Initially a software request 60 from a processor indicating a memory scatter gather should start is received at the DMA controller. $2^R$ data transfers are then performed under control of the primary control data and the toggle bit indicating the control data is then toggled. The alternate control data is then used for the next N data transfers whereupon the toggle bit is toggled again. In this embodiment $2^R$ is 4 as the primary data transfer involves overwriting the four memory locations within the memory containing the alternate control data. N is set to 16, thus, there are four tasks of four transfers that can be performed under control of the primary control data, which means that the alternate data can be updated four times under control of this control data. If the alternate control data were to control the updating of the primary control data, then clearly this could continue with the new primary control data beyond four transfers.

Figure 4:
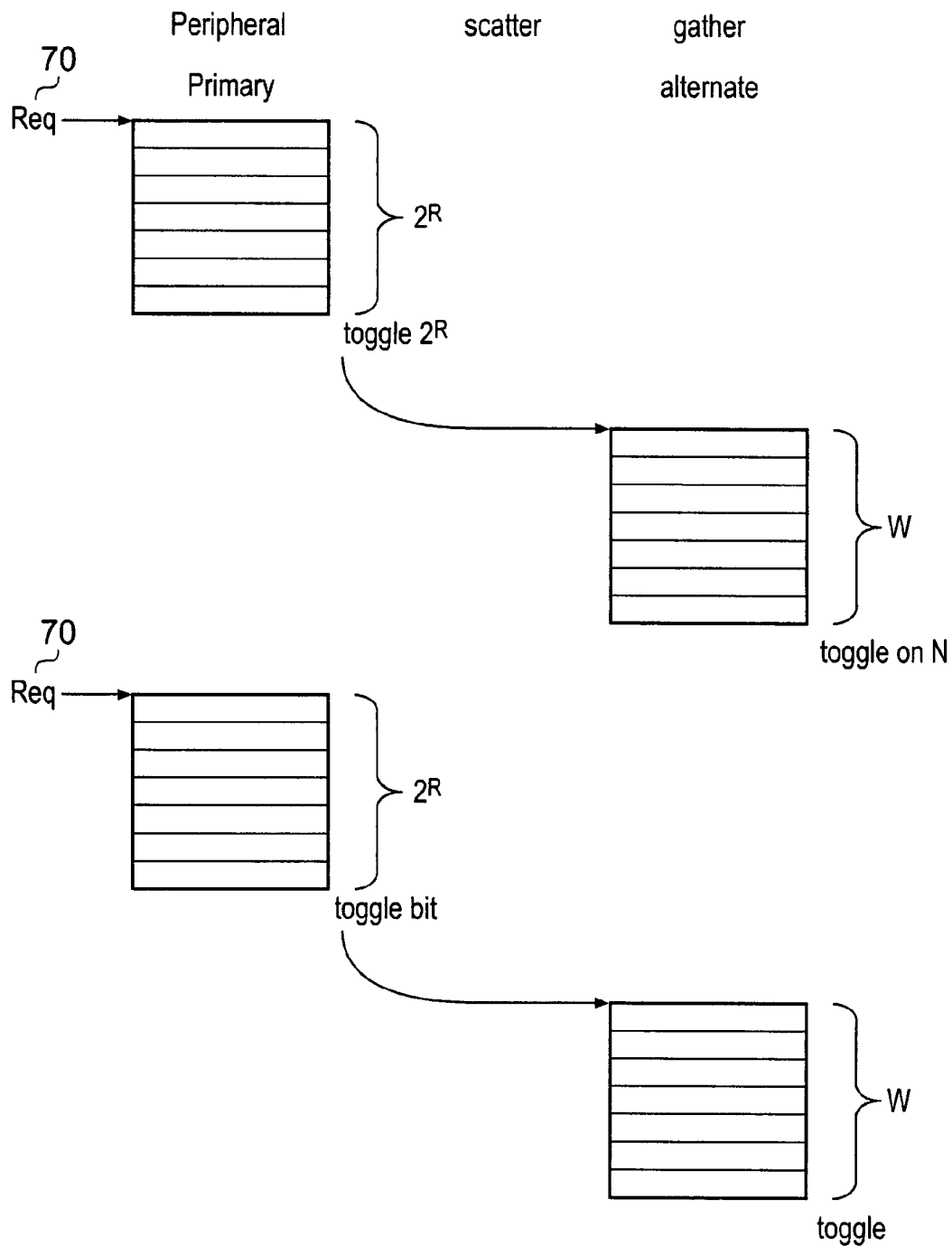
FIG. 4 shows a peripheral scatter gather mode of data transfer controlled by direct memory access controller according to an embodiment of the present invention.

FIG. 4 shows an alternative embodiment in which peripheral scatter gather is illustrated. This is similar to memory scatter gather, however, although a transfer is performed under control of the primary and then automatically under control of the alternate control data, there is then no automatic switch to transfer further data under control of the primary control data again, rather no further data is transferred until a further data transfer request 70 is received. At this point data is transferred under control of the primary control data and then under control of the alternate control data. In other words the transfer does not continue automatically switching between primary and alternate and alternate and primary as was the case in memory scatter gather.

Thus, a request 70 for a data transfer is received at the DMA controller from a peripheral. A data transfer is performed in response to this request under control of the primary control data. This controls the updating of the alternate control data. Once this has completed the toggle bit is toggled and the control of the data transfer is switched to the alternate control data. A data transfer is then performed under control of this updated alternate control data. The data transfer then completes. In response to a further data transfer request from the same peripheral, i.e. on the same channel, the primary control data is used once again to update the alternate control data Further embodiments of the present invention are set out in further detail in the following pages.

The different types of data transfer are determined by cycl_ctrl bits. In the embodiment described the following table illustrates the different possible cycl_ctrl bits.

TABLE 1

| cycle_ctrl | Description |
|---|---|
| b000 | Control data structure is invalid |
| b001 | Basic DMA transfer |
| b010 | Auto-request |
| b011 | Ping-pong |
| b100 | Memory scatter-gather using the primary channel control data |
| b101 | Memory scatter-gather using the alternate channel control data |
| b110 | Peripheral scatter-gather using the primary channel control data |
| b111 | Peripheral scatter-gather using the alternate channel control data |

Note
The cycle_ctrl bits are located in the channel_cfg memory location that Control data configuration.

For all cycle types, the controller arbitrates after $2^R$ DMA transfers. If you set a low-priority channel with a large $2^R$ value then it prevents all other channels from performing a DMA transfer, until the low-priority DMA transfer completes. Therefore, you must take care when setting the R-power, that you do not significantly increase the latency for high-priority channels.

The following sections describe the cycle types:
    Invalid
    Basic
    Auto-request on page 14
    Ping-pong on page 14
    Memory scatter-gather on page 16
    Peripheral scatter-gather on page 19

Invalid
    After the controller completes a DMA cycle it sets the cycle type to invalid. This is to prevent the controller from repeating the DMA cycle.

Basic
    In this mode, you configure the controller to use either the primary or alternate data structure. After you enable the channel, and the controller receives a request then the flow for this DMA cycle is:
1. The controller performs $2^R$ transfers. If the number of transfers remaining is zero the flow continues at step 3.
2. The controller arbitrates:
    if a higher-priority channel is requesting service then the controller services that channel
    if the peripheral or software signals a request to the controller then it continues at step 1.
3. The controller sets dma_done[C] HIGH for one hclk cycle. This indicates to the host processor that the DMA cycle is complete.

Auto-request
    When the controller operates in this mode, it is only necessary for it to receive a single request to enable it to complete the entire DMA cycle.

You can configure the controller to use either the primary or alternate data structure. After you enable the channel, and the controller receives a request for this channel, then the flow for this DMA cycle is:

1. The controller performs $2^R$ transfeers for channel C<x>. If the number of transfers remaining is zero the flow continues at step 3.
2. The controller arbitrates. When channel C<x> has the highest priority then the DMA cycle continues at step 1.
3. The controller set dma_done[C] HIGH for one hclk cycle. This indicates to the host processor that the DMA cycle is complete.

Ping-pong

In ping-pone mode, the controller performs a DMA cycle using one of the channel data structures and it then performs a DMA cycle using the other channel data structure. The controller continues to switch from primary to alternate to primary . . . until it reads a channel control data structure that is invalid, or until the host processor disables the channel.

Figure 5:
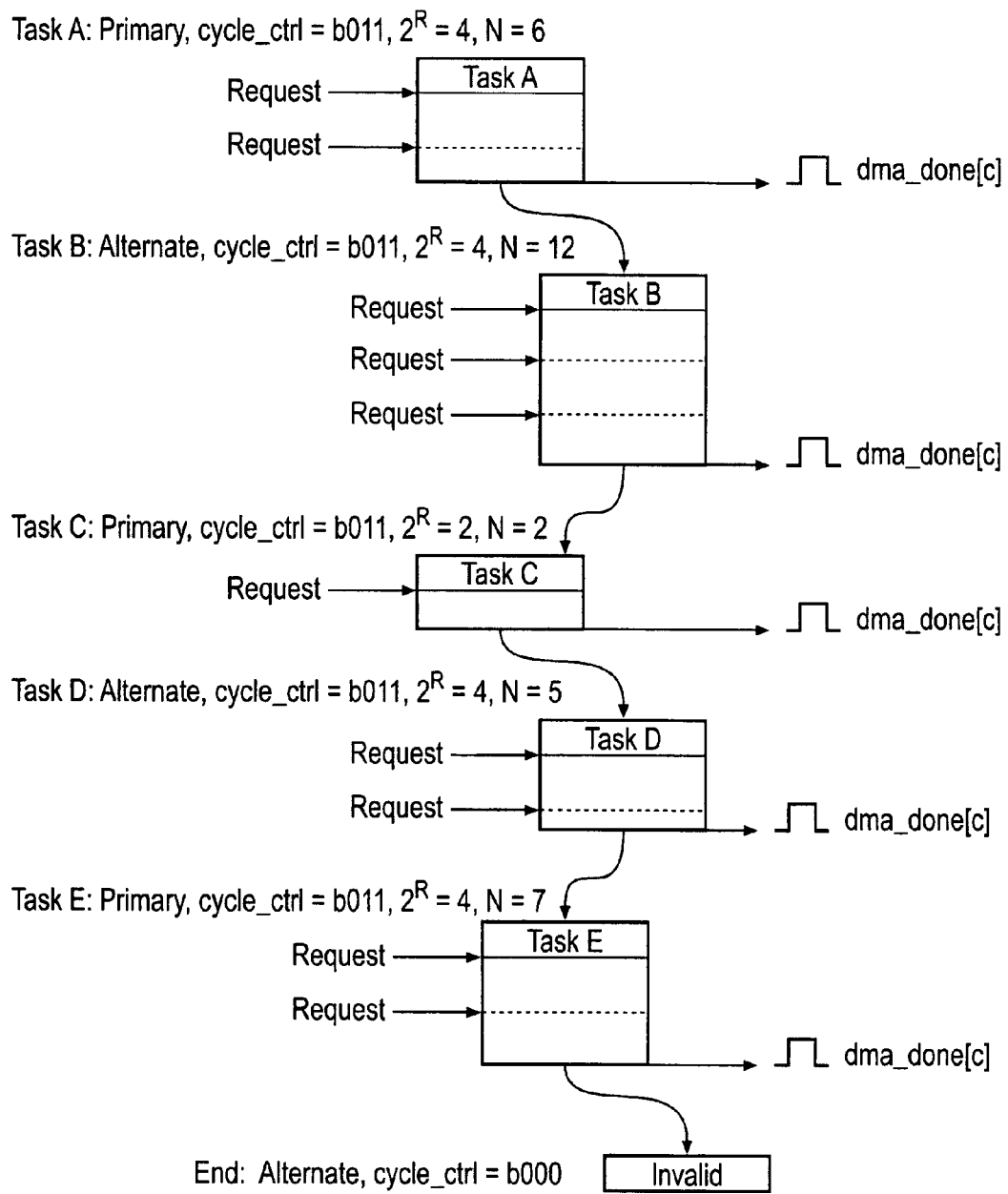
FIG. 5 shows a further ping pong embodiment.

FIG. 5 shows an example of a ping-pong DMA transaction.

In FIG. 5:

Task A 1. The host processor configures the primary channel data structure for task A.
  2. The host configures the alternate channel data structure for task B. This enables the controller to immediately switch to task B after task A completes, provided that a higher priority channel does not require servicing.
  3. The controller receives a request and performs four DMA transfers.
  4. The controller arbitrates. After the controller receives a request for this channel, the flow continues if the channel has the highest priority.
  5. The controller performs the remaining two DMA transfers.
  6. The controller sets dma_done[C] HIGH for one hclk cycle and enters the arbitration process.

After task A completes, the host processor can configure the primary channel data structure for task C. This enables the controller to immediately switch to task C after task B completes, provided that a higher priority channel does not require servicing.

After the controller receives a new request for the channel and it has the highest priority then task B commences:
Task B 7. The controller performs four DMA transfers.
  8. The controller arbitrates. After the controller receives a request for this channel, the flow continues if the channel has the highest priority.
  9. The controller performs four DMA transfers.
  10. The controller arbitrates. After the controller receives a request for this channel, the flow continues if the channel has the highest priority.
  11. The controller performs the remaining four DMA transfers.
  12. The controller sets dma_done[C] HIGH for one hclk cycle and enters the arbitration process.

After task B completes, the host processor can configure the alternate channel data structure for task D.

After the controller receives a new request for the channel and it has the highest priority then task C commences:
Task C 13. The controller performs two DMA transfers.
  14. The controller sets dma_done[C] HIGH for one hclk cycle and enters the arbitration process.

After task C completes, the host processor can configure the primary channel data structure for task E.

After the controller receives a new request for the channel and it has the highest priority then task D commences:
Task D 15. The controller performs four DMA transfeers.
  16. The controller arbitrates. After the controller receives a request for this channel, the flow continues if the channel has the highest priority.
  17. The controller performs the remaining DMA transfer.
  18. The controller set dma_done[C] HIGH for one hclk cycle and enters the arbitration process.

After the controller receives a new request for the channel and it has the highest priority then task E commences:
Task E 19. The controller performs four DMA transfers.
  20. The controller arbitrates. After the controller receives a request for this channel, the flow continues if the channel has the highest priority.
  21. The controller performs the remaining three DMA transfers.
  22. The controller sets dma_done[C] HIGH for one hclk cycle and enters the arbitration process.

If the controller receives a new request for the channel and it has the highest priority then it attempts to start the next task. However, because the host processor has not configured the alternate channel data structure, and on completion of task D the controller set the cycle_ctrl bits to b000, then the ping-pong DMA transaction completes.

Memory Scatter-gather

In memory scatter-gather mode the controller receives an initial request and then performs four DMA transfers using the primary channel data structure. After this transfer completes, it starts a DMA cycle using the alternate channel control data structure. After this cycle completes, the controller performs another four DMA transfers using the primary data structure. The controller continues to switch from primary to alternate to primary . . . until either:
  it reads an invalid channel control data structure
  the host processor configures the alternate data structure for a basic cycle.

The controller asserts dma_done when the scatter-gather transaction completes using a basic cycle.

In scatter-gather mode, the controller uses the primary channel data structure to program the alternate channel control data structure. Therefore you must always program the fields of the primary channel data structure with the values that Table 2 lists.

TABLE 2

Fields in the primary channel data structure that are set to a constant value

| Bit | Field | Value | Description |
| --- | --- | --- | --- |
| [31:30] | dst_inc | b10 | Configures the controller to use word increments for the address |
| [29:28] | dst_size | b10 | Configures the controller to use word transfers |
| [27:26] | src_inc | b10 | Configures the controller to use word increments for the address |
| [25:24] | src_size | b10 | Configures the controller to use word transfers |
| [17:14] | R_power | b0010 | Configures the controller to perform four DMA transfers |
| [2:0][a] | cycle_ctrl | b100 | Configures the controller to perform a memory scatter-gather DMA cycle |
|  |  | b110 | Configures the controller to perform a peripheral scatter-gather DMA cycle |

[a]Set these bits according to the type of scatter-gather DMA cycle that you require.

See Control data configuration on page 24 for more information.

FIG. 6 shows a memory scatter-gather example.

In FIG. 6

Initialization 1. The host processor configures the primary channel data structure to operate in memory scatter-gather mode by setting cycle_ctrl to b100. Because a channel data structure consists of four words then $2^R$ is always set to 4. In this example, there are four tasks and therefore N is set to 16.
  2. The host processor writes information to the memory locations that holds the channel data structure for the tasks A, B, C, and D.
  3. The host processor enables the channel.

The memory scatter-gather transaction commences when the controller receives a request on dma_req[] or a manual request from the host processor. The transaction continues as follows:

Primary, Copy A
  1. After receiving a request, the controller performs four DMA transfers. These transfers write the alternate channel data structure for task A.
  2. The controller generates an auto-request for the channel and then arbitrates.
Task A 3. The controller performs task A. After it completes the task, it generates an auto-request for the channel and then arbitrates.

Primary, Copy B
  4. The controller performs four DMA transfers. These transfers write the alternate channel data structure for task B.
  5. The controller generates an auto-request for the channel and then arbitrates.
Task B 6. The controller performs task B. After it completes the task, it generates an auto-request for the channel and then arbitrates.

Primary, Copy C
  7. The controller performs four DMA transfers. These transfers write the alternate channel data structure for task C.
  8. The controller generates an auto-request for the channel and then arbitrates.
Task C 9. The controller performs task C. After it completes the task, it generates an auto-request for the channel and then arbitrates.

Primary, Copy D
  10. The controller performs four DMA transfers. These transfers write the alternate channel data structure for task D.
  11. The controller set the cycle_ctrl bits of the primary channel control data structure to b000, to indicate that this data structure is now invalid.
  12. The controller generates an auto-request for the channel and then arbitrates.
Task D 13. The controller performs task D using a basic cycle.
  14. The controller sets dma_done[C] HIGH for one hclk cycle and enters the arbitration process.

Peripheral Scatter-gather

In peripheral scatter-gather mode the controller receives an initial request and then it performs four DMA transfers using the primary channel data structure. After this cycle completes and another request has been received, it starts a DMA cycle using the alternate channel control data structure. After this cycle completes, the controller performs another four DMA transfers using the primary data structure. The controller continues to switch from primary to alternate to primary . . . until either:
  it reads an invalid channel control data structure
  the host processor configures the alternate data structure for a basic cycle.

The controller asserts dma_done when the scatter-gather transaction completes using a basic cycle.

In scatter-gather mode, the controller uses the primary channel data structure to program the alternate channel control data structure. Therefore you must always program the fields of the primary channel data structure with the values that Table 2-10 on page 2-25 lists.

See Control data configuration on page 25 for more information.

FIG. 7 shows a peripheral scatter-gather example.

In FIG. 7

Initialization 1. The host processor configures the primary channel data structure to operate in peripheral scatter-gather mode by setting cycle_ctrl to b110. Because a channel data structure consists of four words then $2^R$ is always set to 4. In this example, there are four tasks and therefore N is set to 16.
  2. The host processor writes information to the memory locations that holds the channel data structure for the tasks A, B, C, and D.
  3. The host processor enables the channel.

The peripheral scatter-gather transaction commences when the controller receives a request on dma_req[] or a manual request from the host processor. The transaction continues as follows:

Primary, Copy A
  1. After receiving a request, the controller performs four DMA transfers. These transfers write the alternate channel data structure for task A.
  2. The controller enters the arbitration process.
After the peripheral issues a new request and it has the highest priority then the process continues with:
Task A 3. The controller performs task A. After it completes the task, it generates an auto-request for the channel and then arbitrates.

Primary, Copy B
  4. The controller performs four DMA transfers. These transfers write the alternate channel data structure for task B.
  5. The controller enters the arbitration process.
After the peripheral issues a new request and it has the highest priority then the process continues with:
Task B 6. The controller performs task B. To complete the task, the peripheral must issue a further three requests. After it completes the task, it generates an auto-request for the channel and then arbitrates.

Primary, Copy C
  7. The controller performs four DMA transfers. These transfers write the alternate channel data structure for task C.
  8. The controller enters the arbitration process.
After the peripheral issues a new request and it has the highest priority then the process continues with:
Task C 9. The controller performs task C. After it completes the task, it generates an auto-request for the channel and then arbitrates.

Primary, Copy D
  10. The controller performs four DMA transfers. These transfers write the alternate channel data structure for task D.
  11. The controller sets the cycle_ctrl bits of the primary channel control data structure to b000, to indicate that this data structure is now invalid.
  12. The controller enters the arbitration process.

After the peripheral issues a new request and it has the highest priority then the process continues with:

Task D 13. The controller performs task D using a basic cycle.
14. The controller sets dma_done[C] HIGH for one hclk cycle and enters the arbitration process.

Error Signaling

If the controller detects an ERROR response on the AHB-Lite master interface, it:
  disables the channel that corresponds to the ERROR
  sets dma_err HIGH.

After the host processor detects that dma_err is HIGH, it must check which channel was active when the ERROR occurred. It can do this by:
1. Reading the chnl_enable_set Register to create a list of disable channels.

When a channel asserts dma_done[] then the controller disables the channel. The program running on the host processor must always keep a record of which channels have recently asserted their dma_done[] output.
2. It must compare the disabled channels list from step 1, with the record of the channels that have recently set their dma_done outputs. The channel with no record of dma_done being set is the channel that the ERROR occurred on.

The amount of system memory you require depends on:
  the number of DMA channels you configure the controller to use
  if you configure a DMA channel to use the alternate channel control data.

Table 3 lists the address bits that the controller uses when it access the elements of the channel control data structure, depending on the number of channels that the controller contains.

TABLE 3

Address bit settings for the channel control data

| Number of DMA channels implemented | [9] | [8] | [7] | [6] | [5] | [4] | [3:0] |
|---|---|---|---|---|---|---|---|
| 1 |  |  |  |  |  | A | 0x0, |
| 2 |  |  |  |  | A | C[0] | 0x4, |
| 3-4 |  |  |  | A | C[1] | C[0] | or |
| 5-8 |  |  | A | C[2] | C[1] | C[0] | 0x8 |
| 9-16 |  | A | C[3] | C[2] | C[1] | C[0] |  |
| 17-32 | A | C[4] | C[3] | C[2] | C[1] | C[0] |  |

Where:

A Selects one of the channel control data structures:
  A=0 Selects the primary channel control data structure.
  A=1 Selects the alternate channel control data structure.

C[x:0] Selects the DMA channel.

Address[3:0] Selects one of the control elements:
  0x0 Selects the source end pointer.
  0x4 Selects the destination end pointer.
  0x8 Selects the control.
  0xC The controller does not access this address location. If required, you can enable the host processor to use this memory location as system memory.

2.2.4 Channel Control Data Structure

You must provide an area of system memory to contain the channel control data structure. This system memory must:
  provide a contiguous area of system memory that the controller and host processor can access
  have a base address that is an integer multiple of the total size of the channel control data structure.

FIG. 8 shows the memory that the controller requires for the channel control data structure, when it uses all 32 channels and the optional alternate channels.

The example structure in FIG. 8 uses 1 KB of system memory. In this example, the controller uses the lower 10 address bits to enable it to access all of the elements in the structure and therefore the base address must be at 0xXXXXX000, 0xXXXXX400, 0xXXXXX800, or 0xXXXXXC00.

You can configure the base address for the channel control data structure by writing the appropriate value in the ctrl.base_ptr Register.

_____Note_____

It is not necessary for you to calculate the base address of the alternate channel control data because the alt_ctrl_base_ptr Register provides this information.

FIG. 9 shows an example implementation where the controller uses three DMA channels and the alternate channel control data structure.

The example structure in FIG. 9 uses 128 bytes of system memory. In this example, the controller uses the lower six address bits to enable it to access all of the elements in the structure and therefore the base address must be at 0xXXXXXX00 or 0xXXXXXX80.

Table 4 lists the permitted base address values that you can assign for the channel control data structure, depending on the number of channels that the controller contains.

TABLE 4

Permitted base addresses

| Number of DMA channels | Permitted base addresses for the channel control data structure |
|---|---|
| 1 | 0x<...>00, 0x<...>20, 0x<...>40, 0x<...>60, 0x<...>80, 0x<...>A0, 0x<...>C0, or 0x<...>E0 |
| 2 | 0x<...>00, 0x<...>40, 0x<...>80, or 0x<...>C0 |
| 3-4 | 0x<...>00, or 0x<...>80 |
| 5-8 | 0x<...>000, 0x<...>100, 0x<...>200, 0x<...>300, 0x<...>400, 0x<...>500, 0x<...>600, 0x<...>700, 0x<...>800, 0x<...>900, 0x<...>A00, 0x<...>B00, 0x<...>C00, 0x<...>D00, 0x<...>E00, or 0x<...>F00 |
| 9-16 | 0x<...>000, 0x<...>200, 0x<...>400, 0x<...>600, 0x<...>800, 0x<...>A00, 0x<...>C00, or 0x<...>E00 |
| 17-32 | 0x<...>000, 0x<...>400, 0x<...>800, or 0x<...>C00 |

The controller uses the system memory to enable it to access two pointers and the control information that it requires for each channel. The following subsections describe these 32-bit memory locations and how the controller calculates the DMA transfer address:

Source data end pointer
  Destination data end pointer on page 25
  Control data configuration on page 25
  Address calculation on page 32.

Source Data End Pointer

The src_data_end_ptr memory location contains a pointer to the end address of the source data. Table 5 lists the bit assignments for this memory location.

TABLE 5

| | src_data_end_ptr bit assignments | |
|---|---|---|
| Bit | Name | Description |
| [31:0] | src_data_end_ptr | Source data end pointer |

Before the controller can perform a DMA transfer, you must program this memory location with the end address of the source data. The controller reads this memory location when it starts a $2^R$ DMA transfer.

_____Note_____

The controller does not write to this memory location.

Destination Data End Pointer

The dst_data_end_ptr memory location contains a pointer to the end address of the destination data. Table 6 lists the assignments for this memory location.

TABLE 6

| | dst_data_end_ptr bit assignments | |
|---|---|---|
| Bit | Name | Description |
| [31:0] | dst_data_end_ptr | Destination data end pointer |

Before the controller can perform a DMA transfer, you must program this memory location with the end address of the destination data. The controller reads this memory location when it starts a $2^R$ DMA transfer.

_____Note_____

The controller does not write to this memory location.

Control Data Configuration

Figure 10:
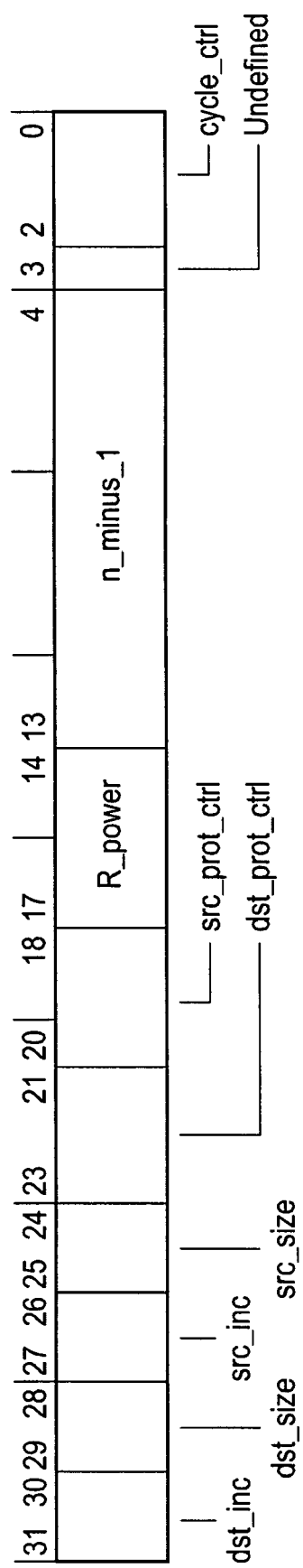
FIG. 10 shows channel configuration bit assignments

For each DMA transfer, the channel_cfg memory location provides the control information for the controller. FIG. 10 shows the bit assignments for this memory location.

Table 7 list the bit assignments for this memory location.

TABLE 7

| | channel_cfg bit assignments | |
|---|---|---|
| Bit | Name | Description |
| [31:30] | dst_inc | Destination address increment. The address increment depends on the source data width as follows: Source data width = byte b00 = byte. b01 = halfword. b10 = word. b11 = no increment. Address remains set to the value that the dst_data_end_ptr memory location contains. Source data width = halfword b00 = reserved. b01 = halfword. b10 = word. b11 = no increment. Address remains set to the value that the dst_data_end_ptr memory location contains. Source data width = word b00 = reserved. b01 = reserved. b10 = word. b11 = no increment. Address remains set to the value that the dst_data_end_ptr memory location contains. |
| [29:28] | dst_size | Destination data size. |

Note
You must set dst_size to contain the same value that src_size contains.

TABLE 8

| | channel_cfg bit assignments (continued) | |
|---|---|---|
| Bit | Name | Description |
| [27:26] | src_inc | Set the bits to control the source address increment. The address increment depends on the source data width as follows: Source data width = byte b00 = byte. b01 = halfword. b10 = word. b11 = no increment. Address remains set to the value that the src_data_end_ptr memory location contains. Source data width = halfword b00 = reserved. b01 = halfword. b10 = word. b11 = no increment. Address remains set to the value that the src_data_end_ptr memory location contains. Source data width = word b00 = reserved. b01 = reserved. b10 = word. b11 = no increment. Address remains set to the value that the src_data_end_ptr memory location contains. |
| [25:24] | src_size | Set the bits to match the size of the source data: b00 = byte b01 = halfword b10 = word b11 = reserved. |

TABLE 8-continued channel_cfg bit assignments (continued)

| Bit | Name | Description |
|---|---|---|
| [23:21] | dst_prot_ctrl | Set the bits to control the state of HPROT[3:1] when the controller writes the destination data. |
| | | Bit [23]    Controls the state of HPROT[3] as follows: |
| | |         0 = HPROT[3] is LOW and the access is non-cacheable. |
| | |         1 = HPROT[3] is HIGH and the access is cacheable. |
| | | Bit [22]    Controls the state of HPROT[2] as follows: |
| | |         0 = HPROT[2] is LOW and the access is non-bufferable. |
| | |         1 = HPROT[2] is HIGH and the access is bufferable. |
| | | Bit [21]    Controls the state of HPROT[1] as follows: |
| | |         0 = HPROT[1] is LOW and the access is non-privileged. |
| | |         1 = HPROT[1] is HIGH and the access is privileged. |
| [20:18] | src_prot_ctrl | Set the bits to control the state of HPROT[3:1] when the controller reads the source data. |
| | | Bit [20]    Controls the state of HPROT[3] as follows: |
| | |         0 = HPROT[3] is LOW and the access is non-cacheable. |
| | |         1 = HPROT[3] is HIGH and the access is cacheable. |
| | | Bit [19]    Controls the state of HPROT[2] as follows: |
| | |         0 = HPROT[2] is LOW and the access is non-bufferable. |
| | |         1 = HPROT[2] is HIGH and the access is bufferable. |
| | | Bit [18]    Controls the state of HPROT[1] as follows: |
| | |         0 = HPROT[1] is LOW and the access is non-privileged. |
| | |         1 = HPROT[1] is HIGH and the access is privileged. |
| [17:14] | R_power | Set these bits to control how many DMA transfers can occur before the controller rearbitrates. |
| | | The possible arbitration rate settings are: |
| | | b0000        Arbitrates after each DMA transfer. |
| | | b0001        Arbitrates after 2 DMA transfers. |
| | | b0010        Arbitrates after 4 DMA transfers. |
| | | b0011        Arbitrates after 8 DMA transfers. |
| | | b0100        Arbitrates after 16 DMA transfers. |
| | | b0101        Arbitrates after 32 DMA transfers. |
| | | b0110        Arbitrates after 64 DMA transfers. |
| | | b0111        Arbitrates after 128 DMA transfers. |
| | | b1000        Arbitrates after 256 DMA transfers. |
| | | b1001        Arbitrates after 512 DMA transfers. |
| | | b1010-b1111    Arbitrates after 1024 DMA transfers. This means that no arbitration occurs |
| | |         during the DMA transfer because the maximum transfer size is 1024. |
| [13:4] | n_minus_1 | Prior to the DMA cycle commencing, these bits represent the total number of DMA transfers that the DMA cycle contains. You must set these bits according to the size of DMA cycle that you require. |
| | | The 10-bit value indicates the number of DMA transfers, minus one. The possible values are: |
| | | b000000000 = 1 DMA transfer |
| | | b000000001 = 2 DMA transfers |
| | | b000000010 = 3 DMA transfers |
| | | b000000011 = 4 DMA transfers |
| | | b000000100 = 5 DMA transfers |
| | | . |
| | | . |
| | | . |
| | | b111111111 = 1024 DMA transfers. |
| | | The controller updates this field immediately prior to it entering the arbitration process. This enables the controller to store the number of outstanding DMA transfers that are necessary to complete the DMA cycle. |
| [3] | — | Undefined. Write as zero. |
| [2:0] | cycle_ctrl | The operating mode of the DMA cycle. The modes are: |
| | | b000        Stop. Indicates that the channel data is invalid. |
| | | b001        Basic. The controller must receive a new request, prior to it entering the arbitration process, to enable the DMA cycle to complete. |
| | | b010        Auto-request. The controller automatically inserts a request for the appropriate channel during the arbitration process. This means that the initial request is sufficient to enable the DMA cycle to complete. |
| | | b011        Ping-pong. The controller performs a DMA cycle using one of the channel control data structures. After the DMA cycle completes, it performs a DMA cycle using the other channel control data structure. After the DMA cycle completes and provided that the host processor has updated the original channel control data structure, it performs a DMA cycle using the original channel control data structure. The controller continues to perform DMA cycles until it either reads an invalid data structure or the host processor changes the cycle_ctrl bits to b001 or b010. See Ping-pong on page 14. |
| | | b100        Memory scatter/gather. See Memory scatter-gather on page 16. |
| | |         When the controller operates in memory scatter-gather mode, you must only use this value in the primary channel control data structure. |
| | | b101        Memory scatter/gather. See Memory scatter-gather on page 16. |
| | |         When the controller operates in memory scatter-gather mode, you must only use this value in the alternate channel control data structure. |
| | | b110        Peripheral scatter/gather. See Peripheral scatter-gather on page 19. |
| | |         When the controller operates in peripheral scatter-gather mode, you must only use this value in the primary channel control data structure. |

TABLE 8-continued channel_cfg bit assignments (continued)

| Bit | Name | Description |
|---|---|---|
| | b111 | Peripheral scatter/gather. See Peripheral scatter-gather on page 19. When the controller operates in peripheral scatter-gather mode, you must only use this value in the alternate channel control data structure. |

At the start of a DMA cycle, or $2^R$ DMA transfer, the controller fetches the channel_cfg from system memory. After it performs $2^R$, or N, transfers it stores the updated channel_cfg in system memory.

The controller does not support a dst_size value that is different to the src_size value. If it detects a mismatch in these values, it uses the src_size value for source and destination and when it next updates the n_minus_1 field, it also sets the dst_size field to the same as the src_size field.

After the controller completes the N transfers it set the cycle_ctrl field to zero, to indicate that the channel_cfg data is invalid. This prevents it from repeating the same DMA transfer.

Address Calculation

To calculate the source address of a DMA transfer, the controller performs a left shift operation on the n_minus_1 value by a shift amount that src_inc specifies, and then substracts the resulting value from the source end pointer. Similarly, to calculate the destination address of a DMA transfer, it performs a left shift operation on the n_minus_1 value by a shift amount that dst_inc specifies, and then subtracts the resulting value from the destination end pointer.

Depending on the value of src_inc and dst_inc, the source address and destination address can be calculated using the equations:

src_inc=b00 and dst_inc=b00 source address=src_data_end_ptr−n_minus_1
destination address=dst_data_end_ptr−n_minus_1.

src_inc=b01 and dst_inc=b01 source address=src_data_end_ptr−(n_minus_1<<1)
destination address=dst_data_end_ptr−(n_minus_1<<1).

src_inc=b10 and dst_inc=b10 source address=src_data_end_ptr−(n_minus_1<<2)
destination address=dst_data$_{end}$_ptr−(n_minus_1<<2).

src_inc=b11 and dst_inc=b11 source address=src_data_end_ptr
destination address=dst_data_end_ptr.

Table 9 lists the destination addresses for a DMA cycle of six words.

TABLE 9

DMA cycle of six words using a word increment
Initial values of channel_cfg, prior to the DMA cycle
src_size = b10, dst_inc = b10, n_minus_1 = b101, cycle_ctrl = 1

| | End Pointer | Count | Difference[a] | Address |
|---|---|---|---|---|
| DMA transfers | 0x2AC | 5 | 0x14 | 0x298 |
| | 0x2AC | 4 | 0x10 | 0x29C |
| | 0x2AC | 3 | 0xC | 0x2A0 |
| | 0x2AC | 2 | 0x8 | 0x2A4 |

TABLE 9-continued

DMA cycle of six words using a word increment
Initial values of channel_cfg, prior to the DMA cycle
src_size = b10, dst_inc = b10, n_minus_1 = b101, cycle_ctrl = 1

| End Pointer | Count | Difference[a] | Address |
|---|---|---|---|
| 0x2AC | 1 | 0x4 | 0x2A8 |
| 0x2AC | 0 | 0x0 | 0x2AC |

Final values of channel_cfg, after the DMA cycle
src_size = b10, dst_inc = b10, n_minus_1 = 0, cycle_ctrl = 0
[a]This value is the result of count being shifted left by the value of dst_inc.

Table 10 lists the destination addresses for a DMA transfer of 12 bytes using a halfword increment.

TABLE 10

DMA cycle of 12 bytes using a halfword increment

Initial values of channel_cfg, prior to the DMA cycle
src_size = b00, dst_inc = b01,
n_minus_1 = b1011, cycle_ctrl = 1, R_power = b11

| | End Pointer | Count | Difference[a] | Address |
|---|---|---|---|---|
| DMA transfers | 0x5E7 | 11 | 0x16 | 0x5D1 |
| | 0x5E7 | 10 | 0x14 | 0x5D3 |
| | 0x5E7 | 9 | 0x12 | 0x5D5 |
| | 0x5E7 | 8 | 0x10 | 0x5D7 |
| | 0x5E7 | 7 | 0xE | 0x5D9 |
| | 0x5E7 | 6 | 0xC | 0x5DB |
| | 0x5E7 | 5 | 0xA | 0x5DD |
| | 0x5E7 | 4 | 0x8 | 0x5DF |

Values of channel_cfg after $2^R$ DMA transfers
src_size = b00, dst_inc = b01, n_minus_1 = b011,
cycle_ctrl = 1, R_power = b11

| | End Pointer | Count | Difference | Address |
|---|---|---|---|---|
| DMA transfers | 0x5E7 | 3 | 0x6 | 0x5E1 |
| | 0x5E7 | 2 | 0x4 | 0x5E3 |
| | 0x5E7 | 1 | 0x2 | 0x5E5 |
| | 0x5E7 | 0 | 0x0 | 0x5E7 |

Final values of channel_cfg, after the DMA cycle
src_size = b00, dst_inc = b01, n_minus_1 = 0,
cycle_ctrl = 0[b], R_power = b11

[a]This value is the result of count being shifted left by the value of dst_inc.
[b]After the controller completes the DMA cycle it invalidates the channel_cfg memory location by clearing the cycle_ctrl field.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A direct memory access controller for controlling data transfer between a plurality of data sources and a plurality of data destinations, said plurality of data sources and data destinations communicating with said direct memory access controller via a plurality of channels, said direct memory access controller further communicating with a memory and a processor, said memory being adapted to store two sets of control data for each of said plurality of channels and for said processor, said direct memory access controller comprising:
   means for receiving a data transfer request from at least one of said plurality of channels and from said processor;
   means for accessing at least one set of corresponding control data stored in said memory;
   means for performing at least a portion of said data transfer requested in dependence upon said accessed control data; and
   an indicator store for each of said plurality of channels and processor, said indicator store comprising an indicator bit indicating which of said two sets of control data is to be accessed, said direct memory access controller configured to toggle said indicator bit following completion of at least a portion of said data transfer controlled by said one set of control data, said direct memory access controller being adapted to perform all of said data transfer in dependence upon said one set of control data and to access the other of said two sets of control data in response to a subsequent data transfer request from a same channel or processor, wherein said direct memory access controller is responsive to completion of a data transfer controlled by said one set of control data to issue an interrupt to said processor to request that said one set of control data is updated, and is responsive to said subsequent data transfer request to access said other set of control data and to perform a further data transfer controlled by said other set of control data, and following completion of said further data transfer to issue an interrupt to said processor to request that said other set of control data is updated, and in response to a further data transfer request from a same channel or processor to access said one set of control data if it has been updated and to commence said further data transfer under control of said one set of control data, and if said one set of control data is detected as not being updated to halt said further data transfer.

2. A direct memory access controller according to claim 1, wherein said direct memory access controller is responsive to completion of a data transfer controlled by said one set of control data to mark said one set of control data as invalid, and to issue an interrupt to said processor to request that said one set of control data marked as invalid is updated and then marked valid, and following completion of said further data transfer to mark said other set of control data as invalid and to issue an interrupt to said processor to request that said other set of control data is updated and marked as valid, and detect if said one set of control data is updated in dependence upon whether it is marked as valid or invalid.

3. A direct memory access controller according to claim 2, said direct memory access controller being adapted to continually perform subsequent data transfers controlled by said one set of control data and said other set of control data until said processor disables said channel or said data transfer completes.

4. A direct memory access control method including a method for controlling data transfer between a plurality of data sources and a plurality of data destinations, said plurality of data sources and data destinations communicating with a direct memory access controller via a plurality of channels, said direct memory access controller further communicating with a memory and a processor, said memory configured to store two sets of control data for each of said plurality of channels and said processor said method comprising the steps of:
   receiving a data transfer request from at least one of said plurality of channels and said processor;
   accessing in response to said data transfer request, one set of said control data stored in said memory relating to said corresponding channel or processor;
   performing at least a portion of said data transfer under control of said accessed control data said direct memory access controller comprising an indicator store for each of said plurality of channels and processor, said indicator store comprising an indicator bit indicating which of said two sets of control data is to be accessed for each of said plurality of channels and processor, and said set of control data accessed in said accessing step depending upon a value of said indicator bit; and
   toggling said indicator bit following completion of at least a portion of said data transfer controlled by said one set of control data, comprising said further steps of, following completion of a data transfer controlled by said one set of control data:
   marking said one set of control data as invalid;
   issuing an interrupt to said processor to request that said one set of control data is updated and marked as valid; and
   in response to receipt of a request to perform a further data transfer:
      accessing said other set of control data;
      performing said further data transfer controlled by said other set bf control data;
      following completion of said further data transfer marking said Other control data as invalid; and
      issuing an interrupt to said processor to request that said other set of control data is updated and marked as valid.
   in response to receipt of a request to perform a yet further data transfer
      accessing said one set of control data and in response to detecting said one set of control data is marked as valid;
      performing said yet further data transfer controlled by said one set of control data.

* * * * *